June 25, 1968 G. PERUGINI 3,390,292
FLUID COOLANT SYSTEM FOR A-PLASMA-JET GENERATOR
Filed May 24, 1966 2 Sheets-Sheet 1
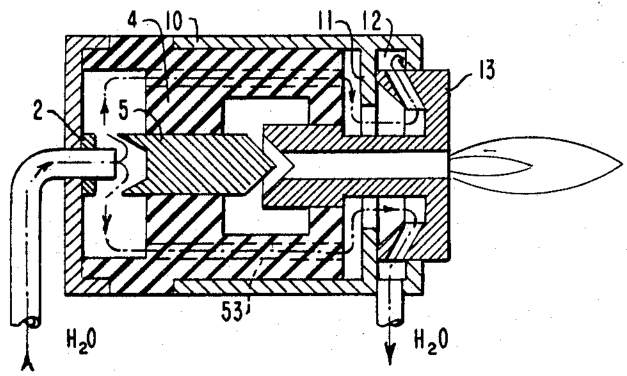
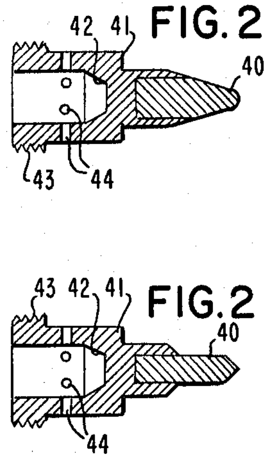
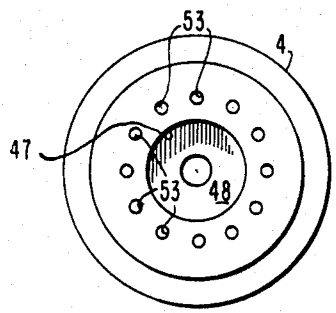
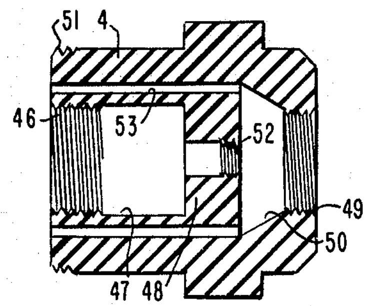
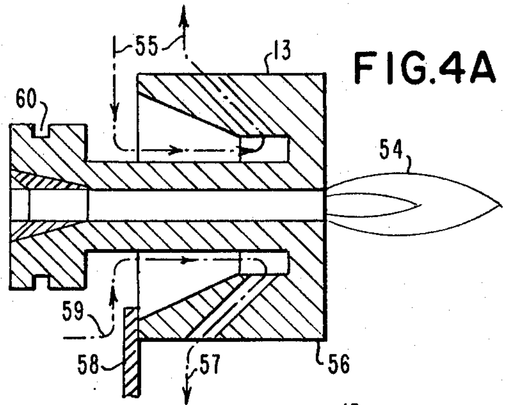
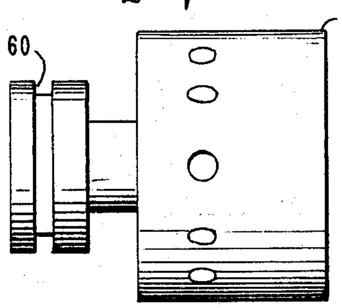

FLUID COOLANT SYSTEM FOR A-PLASMA-JET GENERATOR
Filed May 24, 1966 2 Sheets-Sheet 2
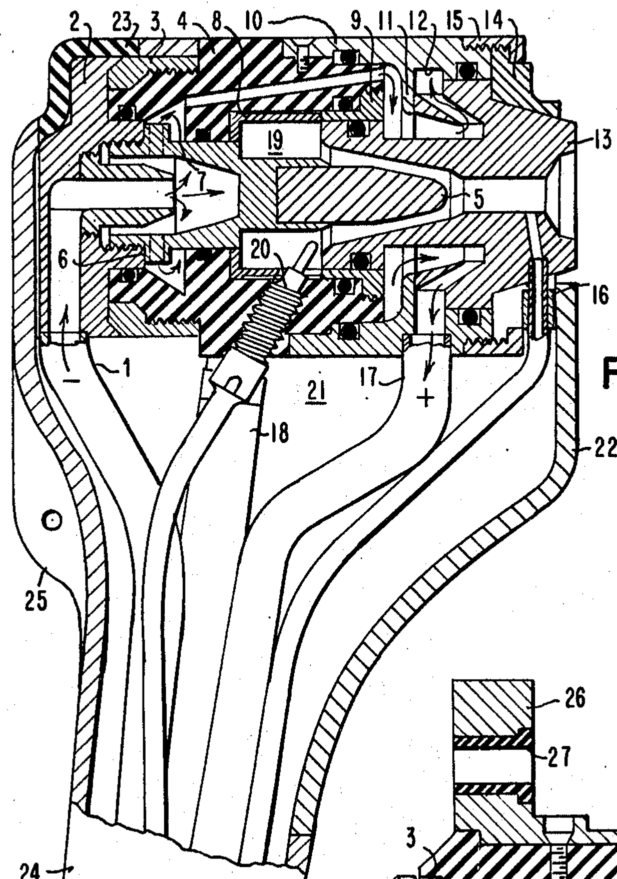
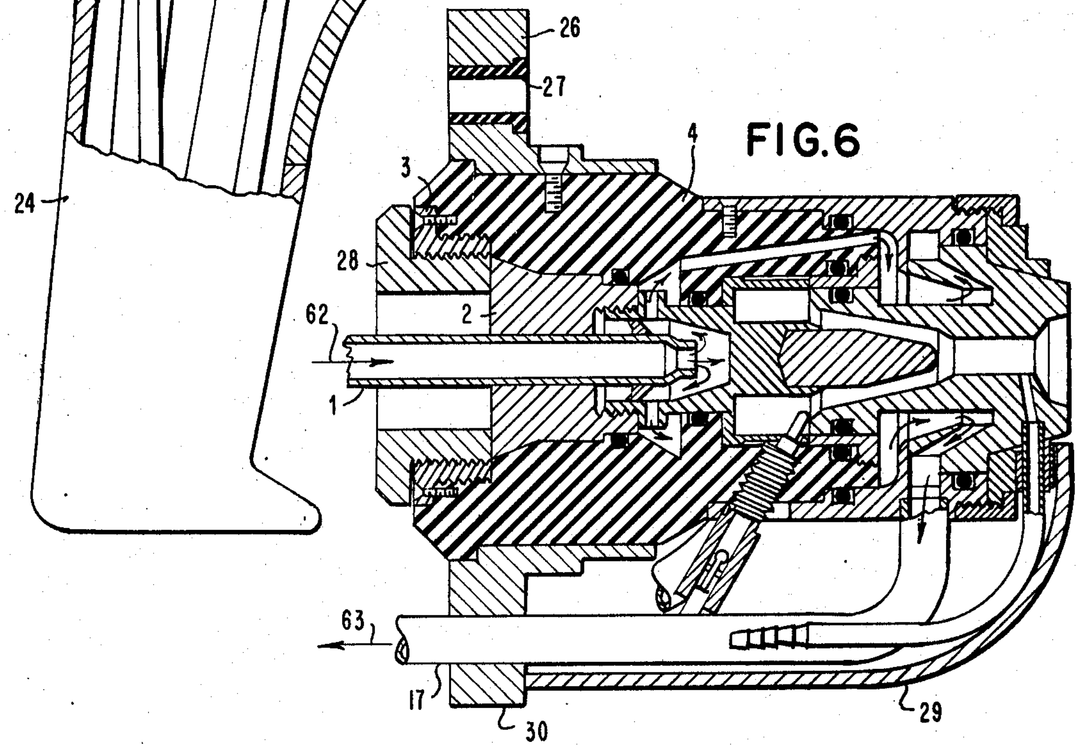

United States Patent Office 3,390,292

Patented June 25, 1968

3,390,292

FLUID COOLANT SYSTEM FOR A PLASMA-JET GENERATOR

Giancarlo Perugini, Merano, Bolzano, Italy, assignor to Montecatini Edison S.p.A., Milan, Italy, a corporation of Italy Filed May 24, 1966, Ser. No. 552,490
Claims priority, application Italy, May 25, 1965, 11,645
6 Claims. (Cl. 313—23)

My invention relates to a plasma-jet generator having either gun form or head form. The plasma-jet generator consists of a cathode support, a cathode, an interelectrode electro-insulating body, an anode support, an anode, and a small auxiliary electrode for arc primer scintillation. I combine the above in a manner such as to give a compact structure of improved functionality and efficiency.

These and other improvements are obtained in the generator by application of a suitable cooling water circulation system, together with the use of electrodes (cathode and anode) shaped so as to favor, on the electrode surfaces inside the chamber and on the arc nozzle, the best energy exchange between the electrons and the arc gas, while simultaneously possessing the best cooling conditions in their external part in direct contact with the water in forced circulation, thereby absolutely preventing the formation of overheated zones and the ensuing phenomena of localized fusions.

An object of my invention therefore is to devise plasma-jet generator devices both of gun type and of head type with improved functionality and efficiency, along with a higher operative elasticity, even under high potentials, thus prolonging the life not only of those parts which are more exposed to thermal wear, like the cathode and anode electrodes, but also the life of the electro-insulating body which in order to be efficient must not suffer from the radiating energy emitted by the plasma-arc, contractions, cracks or alterations of any kind, either in its mass or on its surface.

The most interesting applications of plasma-jet generators are the spray deposit of ordinary materials, a high-temperature chemical reactor and a heat source for the rapid cutting of metals and the fusion of materials having the highest melting points.

Similar plasma-jet generators are already known; however, they present a cathodic and anodic cooling system which is far less efficient. The water circulation inside them has a flow direction with respect to the electrodes which may be defined as being substantially transversal or diametral, that is the water generally enters from the lower part of the generator rear zone and runs towards the center of the cathode zone in the normal sense with respect to the cathode axis, i.e., in monoradial sense with respect to the same. The water, after striking the central part of the cathode zone, moves away therefrom in the monoradial direction opposite to that of the approach phase. Thereafter, from the upper part of the generator rear zone, the water passes through one or more openings provided in the upper part of the interelectrode electro-insulating element (insulating element between electrodes, entering the upper part of the generator front zone, moves monoradially towards the center of the anode zone, strikes the central part of the anode zone, moves away therefrom in the opposite monoradial direction and leaves the generator from the lower part of its front zone.

In other words, the cooling water circuit used in the conventional generators consists of an ascending section, of a horizontal section, and of a descending section. This cooling circuit does not distribute uniformly the cooling water to the elements composing the plasma-jet generator and results in parts which are only partially and unevenly hit by the flowing streams of cooling water. This is particularly true with respect to the cathode and the anode sections.

It must be pointed out furthermore that in nearly all known plasma-jet generators, the cooling of the cathode does not occur by direct contact of the water on the electrode surface. In fact, the cathode is generally tightened onto a cathodic support by means of a blind or passing threaded seat. The cooling must therefore be considered as indirect since the water cools the cathode support which in turn, through the contact of the threading, cools the cathode. This type of connection gives rise to a delicate cooling operation which often results in overheating to the cathode and the very rapid consumption of its tungsten tip. Improper cooling occurs, for instance, when there is too wide a clearance between the male and the female threads so that thermal transmission therethrough is insufficient and hindered. Improper cooling can also occur when the generator is pushed toward higher power values. The plasma generator therefore becomes deprived of its operative power elasticity because of the deficiency of the indirect cathodic cooling.

Another type of commercially available generator is, on the contrary, provided with transversal or diametral cooling, with a direct contact of the cooling water on the cathode surface, but this contact is poorly achieved.

One type of conventional plasma-generator has transversal or diametral cooling with indirect contact on the cathode, the position of which is not adjustable on a blind, threaded seat.

In another type of a similar plasma generator, still with transversal or diametral cooling by indirect contact on the cathode, there is the possibility of adjusting the position of said electrode along a passing threaded seat.

Finally there is a conventional plasma generator having transversal or diametral cooling but with direct contact on the cathode the position of which is not adjustable on a sealing O-ring seat. This latter conventional generator, though having direct cathodic cooling, does not however satisfy the requirements of a rational circulation system suitable for obtaining the higher efficiency and the wider operative elasticity that can be achieved by the generator of the present invention.

In the drawings:

FIG. 1 schematically shows in section a cooling system for a plasma generator;

FIG. 2 shows two sectional views A and B of a cathode;

FIG. 3 shows two views A (section) and B (plan) of an electro-insulating body to be between electrodes;

FIG. 4 shows sectional (A) and front (B) views of an anode;

FIG. 5 shows a longitudinal section of a plasma gun in accordance with my invention; and FIG. 6 shows a longitudinal section of a head form of a plasma generator in accordance with my invention.

The present invention utilizes a cooling device with direct cathodic contact. FIG. 1 of the accompanying drawings schematically shows a cooling circuit according to the system of the present invention, i.e., of the type of direct cathodic action, with coaxial injection through cathode support 2 of water running on the cathode rear surface and subsequent centrifugal displacement, according to multiradial directrixes, towards various circumferential flowing zones, coaxial with respect to the electrodes, and equidirectional with the plasma jet.

As can be clearly seen from this figure, said cooling device contains three characteristic actions operating conjunctly:

(1) Direct cathode cooling of the cathode's 5 rear surface, which is hit by a water jet coaxial with the electrode, and centrifugal subsequent transfer of the water to circumferential peripheral zones by simultaneous flowing through multiradial directrixes;

(2) Cooling of the interelectrode electro-insulating element 4, through the water flowing within holes, not necessarily parallel to the axis, but distributed on circumference having the electrode axis as the center towards the anodic compartment:

(3) Direct anode cooling, by changing the water flow to centripetal through multiradial directrixes, converging the stream simultaneously towards the central zone of electrode 13 and then spreading in a circumferential flow lapping the anode surfaces in an equidirectional sense, with the plasma jet flowing inside the anodic nozzle. The water flow is shown by heavy solid lines labeled $H_2O$ and is in the direction of the arrow.

The above actions are described further with respect to the following component elements:

(a) A cathode 5 consisting of a tungsten tip generally shaped according to various conical profiles, as suitable for each single type of plasma (argon, hydrogen, etc.), is welded onto a generical cylindrical base of copper, internally hollow, with an entrance opening at one end and provided with threading at its external lower part. The latter is surmounted by a ring of holes which allow the cooling water that flows inside the groove to flow out of the ring of holes according to multiradail directrixes, which are not necessarily normal with respect to the axis, in conformity with the schematical representation of this figure. FIG. 2 illustrates schematically the cathodes 5, consisting of a cylindrical copper body 45, internally hollow 42, with an entrance opening at one end, which externally is provided with threading 43 surmounted by a ring of passing holes 44 for communication with the internal groove, and a shoulder 41 and a tungsten tip 40;

(b) FIG. 3 shows an interelectrodic electro-insulating body 4 geometrically consisting of a composition of cylindrical and truncated-conical surfaces, where internally a baffle or diaphragm 48 provided with holes subdivides the cathodic compartment 50 from the arc gas chamber 47, the latter ending with a sealing seat 46 for the anode connection and another sealing seat 51 for connecting anode support 10. The characteristic of the piece resides in the presence of holes 53 for the passage of the water from the cathodic to the anodic compartment, which holes are arranged on an ideal cylindrical or conical surface.

(c) FIG. 4 shows an anode 13 consisting of a copper body where the nozzle is composed of a cylindrical hole, which at the lower base end turns into one or more successive conical flares of variable shape depending on the type of plasma employed (argon, nitrogen, etc.) whereas at the opposite side it may be cylindrical with various shapes to the nozzle. The piece externally resembles in front view (B) a capital letter T. In longitudinal sectional view (A) the piece resembles a ship's anchor. There are oblique holes for discharge of cooling water into a collecting zone on the anodic support. The configuration of the anode forces the water to run in equidirectional sense with the plasma-jet and to create on the anode mass a well distributed and rational cooling according to the flow lines 55 seen in the figure.

With respect to FIGS. 2–4, the reference numerals have the following meaning:

40=tungsten tip
41=cylindrical movable seat being sealed by the O-ring
42=thermal exchange groove, hit by the water jet
43=tightening thread on the cathode support
44=ring of water-outlet holes
45=body having cylindrical shapes, internally hollow at the end opposite to the tungsten tip
46=interchangeable movable seat sealed by the O-ring, for the anode connection
47=arc gas chamber
48=diaphragm separating the cathode compartment from the arc gas chamber
49=stationary seat sealed by the O-ring, for the cathode support connection
50=cathodic compartment with water distribution collector
51=seat sealed by the O-ring for the anode support connection
52=seat sealed by the O-ring for the cathode connection
53=holes for the water passage from the cathode to the anode compartment
54=plasma jet
55=flow lines of the cooling water
56=sealed by the O-ring for connecting the anode to the anode support
57=to the discharge collector groove
58=separating diaphragm (also called annular deflector) making part of the anode support
59=from the distributor groove
60=seat sealed by the O-ring for connection to the interelectrode electro-insulating element separating the arc gas chamber 47 from anodic compartment 61
61=anodic compartment The gun type version of the plasma generator of the present invention is represented in FIG. 5 in longitudinal section. The numerals in FIGS. 5 and 6 always represent the same feature.

The upper part of cathode tube 1 of negative polarity, which supplies continuous electrical current and cooling water, is welded onto an obturator 2 of the cathode compartment. The obturator, which seals the cathode compartment, is fastened, preferably by screws, to the metal conical seat 3 which in turn is connected by screws and/or threading to the interelectrodic electro-insulating element 4, which constitutes an interchangeable insert. Thus the obturator also acts as the cathode support. A portion of tube 1 protrudes along the axis of obturator 2 so that it injects water into the groove of cathode 5, which is fixed to the inner wall of obturator 2 by means of threading. Another advantageous feature of the apparatus of my invention is that the cathode, in order to compensate for consumption on the tungsten tip during its operating life, can be advanced up to 3 mm. by simply inserting additional small washers in the interface zone 6 until the initial clearance at 7 is eliminated. This increases the working life of the cathode and accordingly reduces the depreciation of the cathode.

Other parts of the plasma generator are: anti-radiation template 8, which attenuates the surface temperature on the walls of the arc gas chamber constituted by the electro-insulating materials of which the interelectrodic element is composed, and at the same time hinders the ultraviolet radiations emitted by the plasma from acting upon the electro-insulating material, thereby ultimately altering its chemical structure; the metallic insert 9 which, since it is an easily interchangeable element, avoids the necessity of substituting the entire interelectrode electro-insulating body when the sealing seat of the O-ring should be ruined; anode support 10 comprising annular deflector 11 and water discharge collecting sump 12; anode 13; ring 14 with the locking nut 15; tube 16 for injection of the powder; anode tube 17 for the cooling water discharge and for the return of the electric current; tube 18 for the tangential injection of the gas into the arc chamber; gas vortex chamber 19; small auxiliary electrode 20 for arc priming by scintillation on the anode through an auxiliary electric circuit. Externally the generator is composed of a permanent sheath 21 attached to the plasma generator body by screws; a frontal metallic cup 22 which can be easily removed for inspection of the arc gas connections; the powder tube and a small scintillator electrode; a rear cup made of electro-insulating material 23 preventing the risk of an incidental contact with the cathode which in the case of hydrogen or nitrogen plasmas has an initial voltage of about 280 v.; a handgrip 24 fastened to the permanent sheath by two nails in the lower part and by two fastening screws in the upper part. The mechanical drive seat 25, structurally, makes a part of the handgrip 24.

The plasma-jet generator is shown in FIG. 6 in head form rather than gun version. The variation of this form is not in the functional structure of the generator but in its external configuration. This change is limited only to the rear part in which an extension of the interelectrode electro-insulating element 4 can be found; the metallic insert 3, varied only in its exterior form, has always the task as mentioned hereinbefore. The obturator of the cathodic compartment is slightly modified in form and is fastened not by means of screws, but by a threaded nut 28; the cathode tube 1 and the anode tube 17, instead of descending, go towards the rear part of the generator; element 26 is a flange which serves to fasten the generator onto the supporting panel with through-bolts in holes provided with insulating insert 27; template 29 covering the tubes is easily and promptly removable from flange 26 onto which it is fastened. When mounting and disassembling the elements composing the plasma-jet generator of head type, the various tubes are fastened and removed with respect to flange 28 by tightening and unlocking the yoke 30. 62 and 63 show the flow of cooling water.

In all the drawings, the small black circles indicate rubber O-rings used for the sealing.

Both the gun type and the head type plasma-jet generators are operated as follows. After connecting the generator to a continuous current by suitably flexible copper plaits within rubber coated cables having water circulation, and having sent water into the circuit to attain a flowrate of 10 to 13 l./min., and having started the flow of gas chosen for the feeding of the arc chamber, voltage is applied to the electrodes. Finally a spark is made to jump between the small auxiliary electrode and the anode, thus igniting the arc with a plasma-jet ensuing from the nozzle. After the plasma ignition, the voltage between the idling electrodes greatly decreases, while the current increases rapidly. As is known, the opening voltage of argon is of about 70 v., whereas for hydrogen and nitrogen it is of about 280 v.

The following advantages are achieved with the device of my invention: a greater protection of the electrodes against overheating and therefore prolongation of their life; greater utilization of the cathode because of their adjustable advancement; a higher operative elasticity with a wider range of applicable power and within the range between 5 and 50 kw., which is comprised between 25 and 60% above normal values as can be seen from a comparison of the values cited in Examples 2–3, 5–6, 8–9. Conventional devices do not exceed powers higher than 20, 25, 40 kw. respectively for argon, nitrogen, hydrogen plasmas.

The above-mentioned advantages of the present invention are attained in a physical embodiment which is compact, of small overall size, light, and extremely handy, as contrasted to conventional plasma generators both of gun and head type. The latter type of plasma generator device, proposed by the conventional technique for powers up to 60–65 kw. and to be used for cutting purposes or as chemical reactor, is rather cumbersome and heavy and of slight suitability for the use in the spray coating art. As contrasted to known devices, the present invention constitutes a more rational matching system of the component elements, utilizable both in the spray guns (with the great advantage of the electrode protection, of their longer exploitation, and higher operative elasticity) and in the head types to be used for spray operations by means of mechanical arms, or for rapid cutting operations, or for chemical synthesis operations.

The following table gives 9 examples of the operative characteristics of the plasma generator, both of gun and head type, of the present invention:

TABLE.—OPERATIVE CHARACTERISTICS

| Type of Plasma | Argon | | | Nitrogen | | | Hydrogen | | |
|---|---|---|---|---|---|---|---|---|---|
| Example No. | 1 | 2 | 3 | 4 | 5 | 6 | 7 | 8 | 9 |
| Arc voltage, Volt | 28.5 | 30 | 32.5 | 106 | 104 | 86 | 156 | 146 | 140 |
| Arc current, Amp | 281 | 667 | 985 | 189 | 240 | 407 | 192 | 274 | 357 |
| Applied power, kw | 8 | 20 | 32 | 20 | 25 | 35 | 30 | 40 | 50 |
| Arc gas flow, moles/sec | 0.0203 | 0.0203 | 0.0203 | 0.0254 | 0.0254 | 0.0254 | 0.0890 | 0.0890 | 0.0890 |
| Enthalpic content of jet, Kcal./moles | 74.4 | 155.1 | 231.5 | 151.9 | 188.1 | 257.8 | 71.46 | 91.91 | 110.78 |
| Average temperature of jet, ° C | 10.480 | 12.850 | 13.730 | 6.600 | 7.030 | 7.930 | 3.480 | 3.730 | 3.930 |
| Nozzle section, $mm^2$ | 33.16 | 33.16 | 33.16 | 28.26 | 28.26 | 28.26 | 28.26 | 28.26 | 28.26 |
| Average rate of jet, m./sec | 541 | 660 | 705 | 649 | 892 | 1,211 | 1,454 | 1,723 | 1,914 |
| Heat flow, Kcal./$cm.^2$/sec | 4.55 | 9.49 | 14.17 | 13.65 | 16.91 | 23.18 | 22.5 | 28.9 | 34.9 |

NOTE.—(Examples 3, 6, 9 represent the possibilities of extension from the range of the applicable powers exceeding the higher values normally as indicated in examples 2, 5, 8).

I claim:

1. In a plasma-jet generator comprising a cathode, an interelectrode electro-insulating element and an anode, said cathode and anode being coaxial electrodes, a cooling system which comprises means for injecting a stream of water against the rear of the cathode, multiradial directrixes determined by the rear configuration of the cathode for passage of water to circumferential water passages in the electro-insulating element for conveying the cooling water through said element to the anode, said passage being coaxial to the electrodes and equidirectional to the plasma jet, and means for passing cooling water around the anode to cool the same, said anode has an axial nozzle which presents a series of parallel, cylindrical and truncated-conical shapes obtained on an integral copper body, multiradial directrixes in a first portion of said anode through which the cooling water flows with a centripetal movement and then along a main portion, with a water passage which is circumferential coaxially, and equidirectional with the plasma jet, and finally a ring of holes arranged radially and obliquely on the external annular wall of the anode, an annular diaphragm supporting the anode and a circular discharge collecting zone so that the water entering the anode and the discharge collecting zone are adjacent each other though separated from each other by said annular diaphragm.

2. In the plasma-jet generator of claim 1, wherein the anode support has two plain grooves, one adjacent to the other by interposition of an annular diaphragm, said grooves and annular diaphragm providing for the distribution of the water towards the anode and for the collection of the water coming from the anode after the water has circumferentially flowed about the anode surface in equidirectional sense with the plasma jet.

3. In the plasma-jet generator of claim 2, wherein the cathode used is constituted by a tungsten tip welded onto a copper body which copper body is externally cylindrical and internally hollow with an entrance opening at the end opposite to the tungsten tip, said end being externally provided with threading surmounted by a ring of passing holes communicating with the internal cavity and said ring in turn being surmounted by an O-ring sealing seat.

4. The plasma-jet generator of claim 3, wherein the cathode is directly cooled, and comprising means for axially adjusting the cathode by a few millimeters whereby the erosion of the cathode tip is compensated.

5. In the plasma-jet generator of claim 4, having a cathode obturator which seals the cathode compartment, support means for introduction of water and electric current, and adjustable supports for the cathode.

6. In the plasma-jet generator of claim 4, wherein the interelectrode electro-insulating element contains, coaxially with respect to the electrodes, a ring of holes for jointly conveying the water from the cathode compartment to the anode compartment.

References Cited

UNITED STATES PATENTS

| | | | |
|---|---|---|---|
| 3,106,634 | 10/1963 | Eschenbach | 219—123 X |
| 3,148,263 | 9/1964 | Jensen | 313—231 |
| 3,174,025 | 3/1965 | Johnson | 219—75 |
| 3,179,782 | 4/1965 | Matvay | 219—76 |
| 3,185,778 | 5/1965 | Giannini | 313—213 X |

JAMES W. LAWRENCE, *Primary Examiner*.

STANLEY D. SCHLOSSER, *Examiner*.

S. A. SCHNEEBERGER, *Assistant Examiner*.